(12) United States Patent
Wu et al.

(10) Patent No.: US 12,416,977 B1
(45) Date of Patent: Sep. 16, 2025

(54) ON-SCREEN VIRTUAL KEYBOARDS WITH SIDE-BY-SIDE KEYBOARD PORTIONS

(71) Applicant: Sony Interactive Entertainment LLC, San Mateo, CA (US)

(72) Inventors: Francis Wu, Waterloo (CA); Sakib Chowdhury, Toronto (CA); Jack Cobb, Mono (CA); Michael Kazman, Kitchener (CA); Sidhartha Singh, Brampton (CA); Qinghe Tian, Waterloo (CA); Mathew Snyder, Kitchener (CA)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 18/597,555

(22) Filed: Mar. 6, 2024

(51) Int. Cl.
*G06F 3/023* (2006.01)
*A63F 13/23* (2014.01)

(52) U.S. Cl.
CPC ............ *G06F 3/0236* (2013.01); *A63F 13/23* (2014.09)

(58) Field of Classification Search
CPC .............................. G06F 3/0236; A63F 13/23
See application file for complete search history.

(56) References Cited

U.S. PATENT DOCUMENTS

| | | |
|---|---|---|
| 5,408,621 A | 4/1995 | Ben-Arie |
| 5,543,818 A | 8/1996 | Scott |
| 5,704,837 A | 1/1998 | Iwasaki et al. |
| 5,874,906 A | 2/1999 | Willner et al. |
| 6,259,431 B1 | 7/2001 | Futatsugi et al. |
| 6,392,640 B1 | 5/2002 | Will |
| 6,486,870 B1 | 11/2002 | Kozu |
| 6,512,511 B2 | 1/2003 | Willner et al. |
| 6,593,913 B1 | 7/2003 | Krohn et al. |
| 6,710,766 B1 | 3/2004 | Ogata |
| 7,151,525 B2 | 12/2006 | McAlindon |

(Continued)

FOREIGN PATENT DOCUMENTS

| | | |
|---|---|---|
| CN | 102289290 A | 12/2011 |
| JP | H09062451 A | 3/1997 |

(Continued)

OTHER PUBLICATIONS

U.S. Appl. No. 18/597,508, filed Mar. 6, 2024, Michael Kazman.

(Continued)

*Primary Examiner* — Peter D Mcloone
(74) *Attorney, Agent, or Firm* — Fish & Richardson P.C.

(57) ABSTRACT

Systems and methods described herein include displaying a keyboard on a display. The virtual keyboard is split into a first keyboard portion including an inner zone including one or more letters and an outer zone including a first group of letters that are positioned to surround the inner zone of the first keyboard portion; and into a second keyboard portion including an inner zone including one or more letters and an outer zone including a second group of letters that are positioned to surround the inner zone of the second keyboard portion. The methods and systems described herein include respectively generate first and second signals pertaining to selection of a letter on the first and second keyboard portion in response to a user interacting with one or more control inputs in a first of second group of control inputs on a handheld controller.

22 Claims, 8 Drawing Sheets

(56) References Cited

U.S. PATENT DOCUMENTS

| | | | |
|---|---|---|---|
| 7,199,786 | B2 | 4/2007 | Suraqui |
| 7,218,249 | B2 | 5/2007 | Chadha |
| 7,487,147 | B2 | 2/2009 | Bates et al. |
| 8,405,601 | B1 | 3/2013 | Beale |
| 8,456,425 | B2 | 6/2013 | Walker et al. |
| 8,576,167 | B2 | 11/2013 | Longe et al. |
| 8,780,043 | B2* | 7/2014 | Yoshioka ............ G06F 3/0362 345/157 |
| 2002/0063687 | A1 | 5/2002 | Kim |
| 2002/0156615 | A1 | 10/2002 | Takatsuka et al. |
| 2004/0008186 | A1 | 1/2004 | McAlindon |
| 2004/0070567 | A1 | 4/2004 | Longe et al. |
| 2004/0080487 | A1 | 4/2004 | Griffin et al. |
| 2004/0139254 | A1 | 7/2004 | Tu et al. |
| 2004/0160413 | A1 | 8/2004 | Tamai et al. |
| 2004/0196260 | A1 | 10/2004 | Lin et al. |
| 2004/0222963 | A1 | 11/2004 | Guo et al. |
| 2004/0227728 | A1 | 11/2004 | McAlindon |
| 2006/0114235 | A1 | 6/2006 | Larom |
| 2007/0205983 | A1 | 9/2007 | Naimo |
| 2008/0062015 | A1 | 3/2008 | Bowen |
| 2008/0222318 | A1* | 9/2008 | Yoshioka ............ G06F 3/0236 710/31 |
| 2008/0222571 | A1 | 9/2008 | Yoshioka |
| 2013/0019204 | A1 | 1/2013 | Kotler et al. |
| 2016/0034179 | A1* | 2/2016 | Medina ............ G06F 3/0219 715/773 |

FOREIGN PATENT DOCUMENTS

| | | |
|---|---|---|
| JP | H10275046 A | 10/1998 |
| JP | 2004220386 A | 8/2004 |
| WO | WO 2000075765 A1 | 12/2000 |
| WO | WO 2006073273 A1 | 7/2006 |
| WO | WO 2008097196 A1 | 8/2008 |
| WO | WO 2008109480 A2 | 9/2008 |
| WO | WO 2013127431 A1 | 9/2013 |

OTHER PUBLICATIONS

[No Author Listed], "Computer Keyboard Design", upon information and belief, available no later than Jun. 2014, retrieved on Jan. 23, 2025, retrieved from URL<https://ergo.human.cornell.edu/AHTutorials/ckd.htm>, 3 pages.
Amento, et al., "Performance Models: Fitts Law", 1996, retrieved on Jan. 23, 2025, retrieved from URL< https://ei.cs.vt.edu/~cs5724/g1/>, 2 pages.
Arif et al., "Analysis of Text Entry Performance Metrics," 2009 IEEE Toronto International Conference Science and Technology for Humanity (TIC-STH), Sep. 2009, 6 pages.
Baker et al., "Why do we all use Qwerty keyboards?," BBC News Technology, Aug. 11, 2010, retrieved on Jan. 23, 2025, retrieved from URL<https://www.bbc.com/news/technology-10925456>, 9 pages.
Bi et al., "Quasi-qwerty soft keyboard optimization," Proceedings of the SIGCHI Conference on Human Factors in Computing Systems, Apr. 2010, pp. 283-286.
Breuer, "InkBoard—designing a pen-centric on-screen keyboard," Jan. 10, 2011, retrieved on Jan. 23, 2025, retrieved from URL<http://blog.felixbreuer.net/2011/01/10/inkboard.html>, 9 pages.
Bucao, "The Workman Keyboard Layout Philosophy," Sep. 6, 2010, retrieved on Jan. 23, 2025, retrieved from URL<https://viralintrospection.wordpress.com/2010/09/06/a-different-philosophy-in-designing-keyboard-layouts/>, 79 pages.
Card et al., "Evaluation of mouse, rate-controlled isometric joystick, step keys, and text keys, for text selection on a CRT," Book of Human-Computer Interaction, Apr. 1977, 29 pages.
Entertainment Software Association (ESA), "Essential Facts About the Computer and Video Game Industry", Jul. 2013, 16 pages.
Fitts, "The Information Capacity of the Human Motor System in Controlling the Amplitude of Movement," Journal of Experimental Psychology, Jun. 1954, 47(6):381-391.

Göktürk, "Fitts's Law", Encyclopedia of Human-Computer Interaction, 2013, retrieved on Jan. 23, 2025, retrieved from URL<https://www.interaction-design.org/literature/book/the-glossary-of-human-computer-interaction/fitts-s-law>, 5 pages.
Hopkins, "The Design and Implementation of Pie Menus," Dr. Dobb's Journal, Dec. 1991, retrieved on Jan. 23, 2025, retrieved from URL<https://donhopkins.medium.com/the-design-and-implementation-of-pie-menus-80db1e1b5293>, 22 pages.
Hosken, "An introduction to keyboard design theory: What Goes Where?", NRSI: Computer & Writing Systems, Feb. 17, 2003, retrieved on Jan. 23, 2025, retrieved from URL<https://scripts.sil.org/cms/scripts/page.php?id=keybrddesign&site_id=nrsi>, 12 pages.
Huot et al., "Spiralist: A Compact Visualization Technique for One-Handed Interaction with Large Lists on Mobile Devices," Proceedings of the 4th Nordic conference on Human-computer interaction: changing roles, Oct. 2006, pp. 445-448 (Author Manuscript, 4 pages).
International Search Report and Written Opinion in International Appln. No. PCT/US2015/042195, mailed on Oct. 19, 2015, 10 pages.
Kurtenbach, "The Design and Evaluation of Marking Menus," Thesis submitted in conformity with the requirements of the Degree of Doctor of Philosophy, Graduate Department of Computer Science, University of Toronto, Jun. 2014, 201 pages.
MacKenzie et al., "The Design and Evaluation of a High-Performance Soft Keyboard," CHI 99: Proceedings of the SIGCHI conference on Human Factors in Computing Systems, May 1999, pp. 25-31.
MacKenzie, "Fitts' Law as a Research and Design Tool in Human-Computer Interaction," Human-Computer Interaction, Mar. 1992, 7(1):91-139.
MacKenzie, "Movement Time Prediction in Human-Computer Interfaces", Human-Computer Interaction, Jun. 1995, 17 pages.
netflix.com [online], "Netflix Official Site," upon information and belief, available no later than Jan. 17, 1999, retrieved on Jan. 23, 2025, retrieved from URL<https//netflix.com/>, 5 pages.
Samp, "Designing graphical menus for novices and expert: connecting design characteristics with design goals", Proceedings of the SIGCHI Conference on Human Factors in Computing Systems, Apr. 2013, pp. 3159-3168.
Screenshot at 0:47 of "Radial—Netflix Hack Day—Feb. 2014" video at «http://www.youtube.com/watch?v=DfS4zmryYo4» posted Feb. 26, 2014, 1 page.
Screenshot at 1 :12 of "Steam's Big Picture" video at <<http://store.steampowered.com/bigpicture>>, accessed Jun. 12, 2014, 1 page.
Stamp, "Fact of Fiction? The Legend of the Qwerty Keyboard", Smithsonian Magazine, May 3, 2013, retrieved on Jan. 24, 2025, retrieved from URL<https://www.smithsonianmag.com/arts-culture/fact-of-fiction-the-legend-of-the-qwerty-keyboard-49863249/>, 11 pages.
statisticbrain..com [online], "Television Watching Statistics", Sep. 2013, retrieved on Jan. 24, 2025, retrieved from URL<https://web.archive.org/web/20131011193623/http://www.statisticbrain.com:80/television-watching-statistics», 3 pages.
steampowered.com [online], "Valves Steam Official Site", upon information and belief, available no later than May 14, 2007, retrieved on Jan. 23, 2025, retrieved from URL<store.steampowered.com/>, 4 pages.
Wong, "Soft Keyboard (onscreen keyboard or software keyboard)", TechTarget, Mar. 2011, retrieved on Jan. 23, 2025, retrieved from URL<whatis.techtarget.com/definition/sofl-keyboard-onscreen-keyboard-or-software-keyboard>, 2 pages.
xbox.com [online], "Microsoft Xbox One Official Site (Meet Xbox One. The all=in-one entertainment system," upon information and belief, available no later than Aug. 19, 2013, retrieved on Jan. 23, 2025, retrieved from URL<https://www.xbox.com/en-US/consoles#adrenalinejunkie>, 5 pages.
xbox.com [online], "Microsoft Xbox SmartGlass Official Site (Introducing Xbox SmartGlass)", upon information and belief, available no later than Oct. 24, 2012, retrieved on Jan. 23, 2025, retrieved from URL<http://www.xbox.com/en-US/smartglass>>, 5 pages.

(56) References Cited

OTHER PUBLICATIONS

Yamada, "A Historical Study of Typewriters and Typing Methods: From the Position of Planning Japanese Parallels" Journal of Information Processing, Jan. 1980, 2(4):175-202.

* cited by examiner

ON-SCREEN VIRTUAL KEYBOARDS WITH SIDE-BY-SIDE KEYBOARD PORTIONS

CROSS-REFERENCE TO RELATED APPLICATIONS

This application is related to U.S. Non-Provisional application Ser. No. 18/597,508, filed on the same date as this application, entitled "ON-SCREEN, SPLIT VIRTUAL KEYBOARDS," the entire disclosure of which is hereby fully incorporated by reference herein in its entirety.

Technical Field

This invention relates generally to virtual keyboards and, more specifically, to on-screen split virtual keyboards that enable the user to enter characters using two separate cursors.

BACKGROUND

Typical virtual keyboards generated on screens coupled to computing devices, gaming consoles, and the like generally have a layout resembling the layout of their counterpart physical keyboards. Such virtual keyboards include one on-screen cursor, which may be moved by a user via a controller from one letter to the next letter to input each word letter by letter, which is not very efficient, and can be time consuming when entering long words or phrases.

SUMMARY

In some embodiments, a method includes displaying a keyboard on a display. The keyboard is split into a first keyboard portion including an inner zone including one or more first letters of an alphabet and an outer zone including a first group of letters of the alphabet that are positioned to surround the inner zone of the first keyboard portion, and a second keyboard portion including an inner zone including one or more second letters of the alphabet and an outer zone including a second group of letters of the alphabet that are positioned to surround the inner zone of the second keyboard portion. The method also includes generating first signals pertaining to selection of a letter on the first keyboard portion in response to a user interacting with one or more control inputs in a first group of control inputs on a controller and generating second signals pertaining to selection of a letter on the second keyboard portion in response to the user interacting with one or more control inputs in a second group of control inputs on the controller.

In some implementations, the first signals cause a first cursor to move within the first keyboard portion and cause the letter in the first keyboard portion to be selected, and the second signals cause a second cursor to move within the second keyboard portion and cause the letter in the second keyboard portion to be selected.

In some aspects, the first group of letters of the alphabet of the outer zone of the first keyboard portion is positioned to encircle the one or more first letters of the alphabet of the inner zone of the first keyboard portion, and the second group of letters of the alphabet of the outer zone of the second keyboard portion is positioned to encircle the one or more first letters of the alphabet of the inner zone of the second keyboard portion.

In some embodiments, the first group of control inputs is located on a left side of the handheld controller and the second group of control inputs is located on a right side of the handheld controller. In certain aspects, the user interacting with one or more control inputs in the first group of control inputs on the handheld controller comprises the user interacting with a first analog control input, and the user interacting with one or more control inputs in the second group of control inputs on the handheld controller comprises the user interacting with a second analog control input.

In some implementations, the one or more control inputs in the first group of control inputs and the one or more control inputs in the second group of control inputs are respectively configured to allow a first cursor on the first keyboard portion and a second cursor on the second keyboard portion to be moved substantially simultaneously.

In some embodiments, the inner zone of each of the first and second keyboards includes one letter and the outer zone of each of the first and second keyboard includes twelve letters. In other embodiments, the inner zone of each of the first and second keyboards includes at least two letters and the outer zone of each of the first and second keyboard includes at most eleven letters.

In some embodiments, a non-transitory computer readable storage medium storing one or more computer programs configured to cause a processor-based system to execute steps comprising displaying a keyboard on a display. The keyboard is split into: a first keyboard portion including an inner zone including one or more first letters of an alphabet and an outer zone including a first group of letters of the alphabet that are positioned to surround the inner zone of the first keyboard portion; and a second keyboard portion including an inner zone including one or more second letters of the alphabet and an outer zone including a second group of letters of the alphabet that are positioned to surround the inner zone of the second keyboard portion; generating first signals pertaining to selection of a letter on the first keyboard portion in response to a user interacting with one or more control inputs in a first group of control inputs on a handheld controller; and generating second signals pertaining to selection of a letter on the second keyboard portion in response to the user interacting with one or more control inputs in a second group of control inputs on the handheld controller.

In some embodiments, a system includes a display; a handheld controller; and a processor-based system in communication with the display and the handheld controller and configured to execute steps including displaying a keyboard on a display. The keyboard is split into: a first keyboard portion including an inner zone including one or more first letters of an alphabet and an outer zone including a first group of letters of the alphabet that are positioned to surround the inner zone of the first keyboard portion; and a second keyboard portion including an inner zone including one or more second letters of the alphabet and an outer zone including a second group of letters of the alphabet that are positioned to surround the inner zone of the second keyboard portion; generating first signals pertaining to selection of a letter on the first keyboard portion in response to a user interacting with one or more control inputs in a first group of control inputs on a handheld controller; and generating second signals pertaining to selection of a letter on the second keyboard portion in response to the user interacting with one or more control inputs in a second group of control inputs on the handheld controller.

A better understanding of the features and advantages of various embodiments of the present invention will be obtained by reference to the following detailed description and accompanying drawings which set forth illustrative embodiments of the invention.

BRIEF DESCRIPTION OF THE DRAWINGS

Disclosed herein are embodiments of systems and methods pertaining to on-screen side-by-side virtual keyboards that enable the user to enter characters using two separate cursors. This description includes drawings, wherein.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods described herein include displaying a keyboard on a display. The virtual keyboard is split into a first keyboard portion including an inner zone including one or more letters and an outer zone including a first group of letters that are positioned to surround the inner zone of the first keyboard portion; and into a second keyboard portion including an inner zone including one or more letters and an outer zone including a second group of letters that are positioned to surround the inner zone of the second keyboard portion. The methods and systems described herein include respectively generate first and second signals pertaining to selection of a letter on the first and second keyboard portion in response to a user interacting with one or more control inputs in a first of second group of control inputs on a handheld controller.

Figure 1:
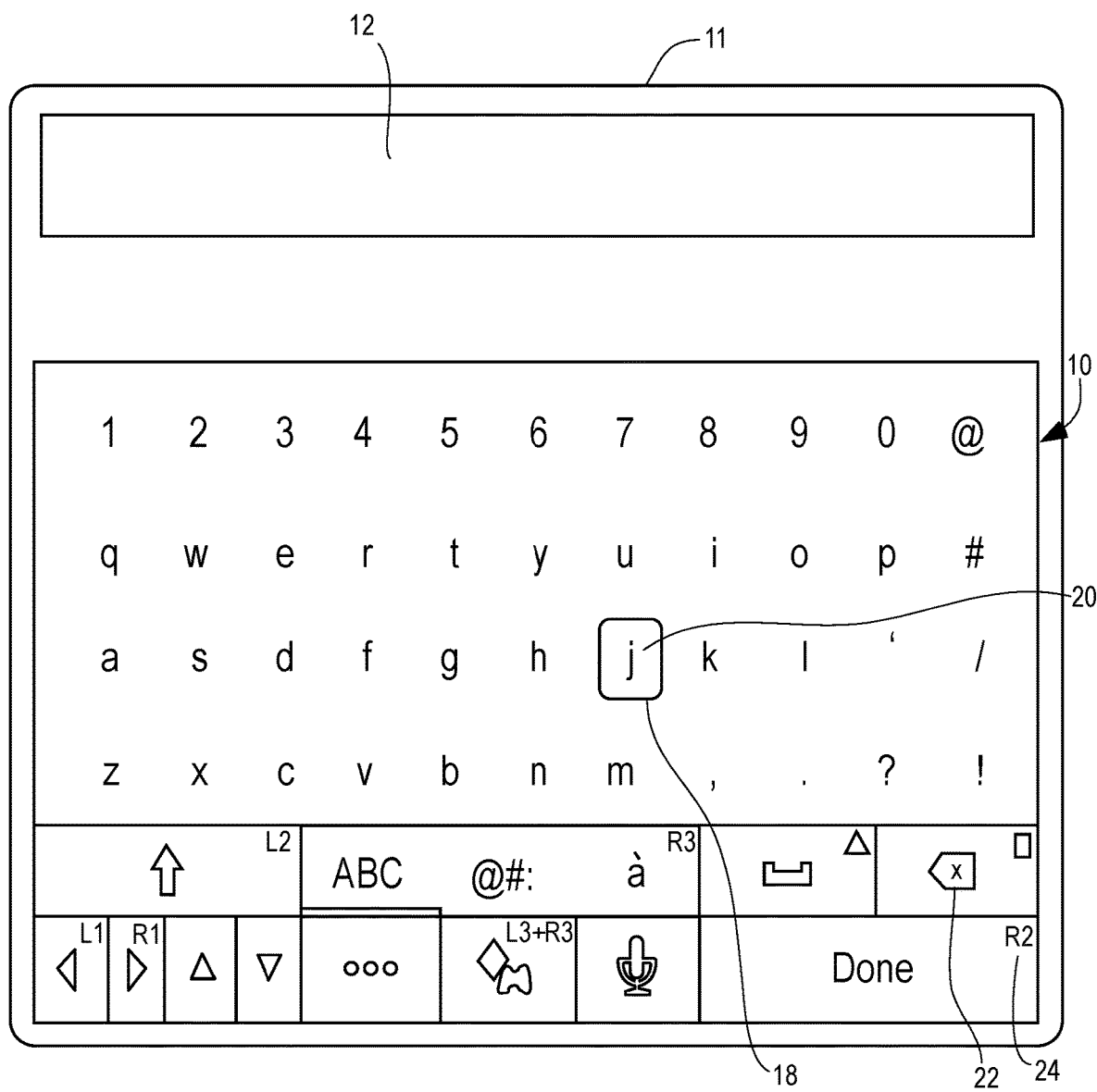
FIG. 1 depicts a display screen view diagram illustrating a prior art virtual keyboard visible thereon.

FIG. 1 shows a conventional virtual keyboard 10, which may be displayed on a screen 11 of a display (e.g., a television, monitor, handheld device, etc.), and which enables a user to type one or more words into a text input field 12 by using a cursor 18 to select one character 20 (e.g., a letter, a number, or a symbol) at a time. The keyboard 10 may include special characters 22 (e.g., up arrow, space bar, back space, etc.), which may be selected with the use of the cursor 18, or by pressing a specific input 24 (e.g., a button labeled with letters and/or symbols A, B, X, Y, with a "cross," "circle," "triangle," "square," L1, L2, R1, and/or R2, etc.) on a hand-held controller 130 (see, e.g., FIG. 2) being operated by a user, and the specific input 24 of the controller 130 that may be interacted with by the user to select one of these special characters 22 may be displayed within the virtual keyboard 10 on the screen 11. Since this keyboard 10 is limited to selection of one character 20 at a time by sequentially moving one cursor 18 to each of the letters of an intended word or phrase, typing in a long word or phrase may become time consuming or tedious for a user.

Figure 2:
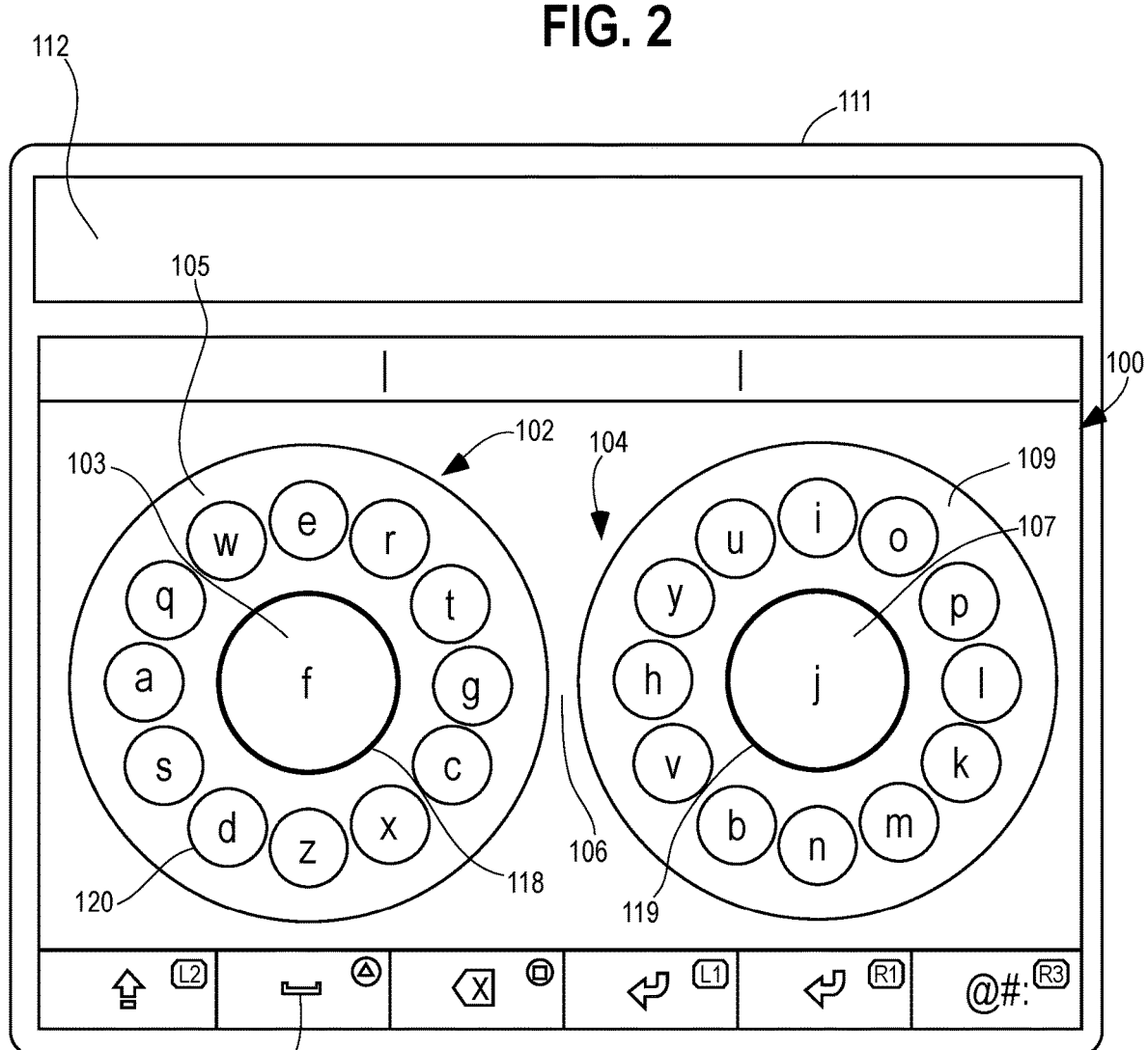
FIG. 2 depicts a display screen view diagram illustrating a hand-held controller and a virtual keyboard in accordance with some embodiments.
Figure 2:
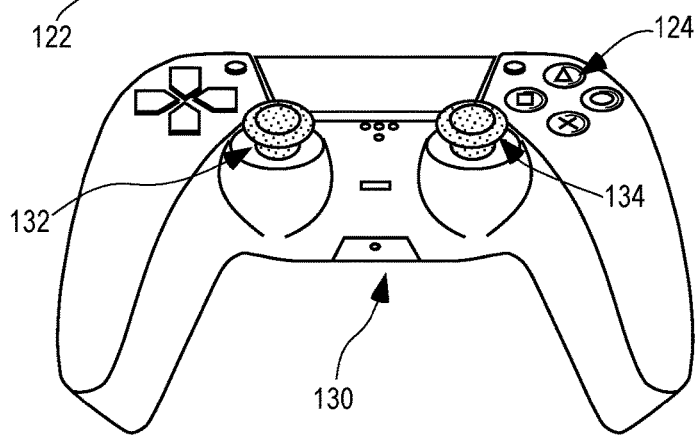

FIG. 2 shows a virtual keyboard 100 according to some embodiments described herein, which is displayed on a screen 111 of a display (e.g., a television, monitor, handheld device, etc.), and which facilitates the ease, speed, and accuracy of typing by a user of a hand-held controller 130. The keyboard 100 includes a first keyboard portion 102 and a second keyboard portion 104. Each of the first and second keyboard portions 102, 104 of the exemplary virtual keyboard 100 illustrated in FIG. 2 may include characters 120 such as letters (e.g., a, b, c, etc.), numbers (1, 2, 3, etc.), and special symbols (e.g., question mark, exclamation, coma, period, etc.).

Notably, the virtual keyboard 100 does not have to be limited to only two keyboard portions 102, 104. For example, in some embodiments, the virtual keyboard 100 may include four (or more) different keyboard portions each including different characters (e.g., letters, numbers, symbols, etc.), and the user is permitted to switch between the first keyboard portion 102 and a third keyboard portion by pressing a pre-determined button input (e.g., L2, etc.) on the hand-held controller 130, and to switch between the second keyboard portion 104 and a fourth keyboard portion by pressing a pre-determined button input (e.g., R2, etc.) on the hand-held controller 130.

Like the conventional virtual keyboard 10 shown in FIG. 1, the virtual keyboard 100 according to the embodiment illustrated in FIG. 2 includes an input field 112, which enables the user to type in letters, numbers, and special symbols/characters by sequentially selecting the appropriate characters 120 on the virtual keyboard 100 using a hand-held controller 130. Also like the conventional virtual keyboard 10 shown in FIG. 1, the exemplary virtual keyboard 100 of FIG. 2 includes special characters 122 (e.g., up arrow, space bar, back space, etc.), which may be selected with the use of the cursor 118, or by pressing a specific input 124 (e.g., button) on a hand-held controller 130 being operated by a user, causing the specific input 124 that the user interacts with to select one of these special characters 122 to be displayed on the screen 111.

Unlike the conventional virtual keyboard 10 of FIG. 1, in the exemplary keyboard 100 shown in FIG. 2, the first keyboard portion 102 and the second keyboard portion 104 of the virtual keyboard 100 are visibly separated by a space or a gap 106, making it clearly visible to a user that the first keyboard portion 102 is separate and distinct from the second keyboard portion 104. It will be appreciated, however, that, in some embodiments, the first keyboard portion 102 and the second keyboard portion 104 may be separately operable and distinct, but positioned so close together relative to each other such that there would not be a visible gap therebetween.

The exemplary virtual keyboard 100 of FIG. 2 is shown as having a first virtual keyboard portion 102 including an inner zone 103 including at least one character field 120 each containing one letter and an outer zone 105 including a plurality of character fields 120 each containing one letter. In addition, the exemplary virtual keyboard 100 of FIG. 2 has a second virtual keyboard portion 104 including an inner zone 107 including at least one character field 120 each containing one letter and an outer zone 109 including a plurality of character fields 120 each containing one letter. In the embodiment illustrated in FIG. 2, each of the inner zones 103, 107 and outer zones 105, 109 has a generally circular overall shape, and each of the outer zones 105, 109 surrounds/encircles its respective inner zone 103, 107. It will be appreciated that the inner zones 103, 107 and outer zones 105, 109 do not have to be generally circular, and may be of another suitable overall shape.

With reference to FIG. 2, the first keyboard portion 102 and the second keyboard portion 104 of the virtual keyboard 100 each contain one half of the letters of the English alphabet, with the first keyboard portion 102 containing a total of thirteen letters (one letter "f" in the inner zone 103, and twelve letters "a," "s," "d," "z," "x," "c," "g," "t," "r," "e," "w," and "q" in the outer zone 105), and the second keyboard portion 104 similarly containing a total of thirteen letters (one letter "j" in the inner zone 107, and twelve letters "h," "v," "b," "n," "m," "k," "l," "p," "o," "i," "u," and "y" in the outer zone 109). It will be appreciated that the total number of letters located in each of the zones 103, 105, 107, 109 of the virtual keyboard 100, as well as the locations of each of the letters within its respective zone 103, 105, 107, 109 are shown by way of example only.

For example, in some embodiments, each of the inner and outer zones 103, 105, 107, 109 may have different letters or a different total number of letters in them, or include the same letters, but in different locations within their respective zones 103, 105, 107, 109. For example, in some implementations, each of the inner zones 103, 107 may include four letters while each of the outer zones 105, 109 may include nine letters. In addition, as will be discussed above with reference to FIG. 5, in one embodiment, the virtual keyboard 400 includes a first keyboard portion 402 with an inner zone 403 including six letters of the English alphabet and an outer zone 405 including seven letters of the English alphabet, as well as a second keyboard portion 404 with an inner zone 407 that includes six letters of the English alphabet and an outer zone 409 that includes seven letters of the English alphabet.

Another difference between the exemplary keyboard 100 of FIG. 2 and the conventional keyboard 10 of FIG. 1 is that the keyboard 100 includes not one cursor 18, but two separate cursors 118 and 119 that facilitate a user's selection of characters 120 on the first and second keyboard portions 102, 104 of the virtual keyboard 100. In other words, the first keyboard portion 102 includes its own dedicated cursor 118, which permits the user to select the characters 120 (e.g., letters) of the first keyboard portion 102 but not the characters 120 (e.g., letters) of the second keyboard portion 104. Similarly, the second keyboard portion 104 includes its own dedicated cursor 119, which permits the user to select the characters 120 of the second keyboard portion 104, but not the characters 120 of the first keyboard portion 102.

In the illustrated embodiment, a handheld controller 130 (which will be discussed in more detail below) is used to move the first cursor 118 on the first keyboard portion 102 to select a character 120 desired by the user, and to move the second cursor 119 on the second keyboard portion 104 to select a character 120 desired by the user. In one implementation, the hand-held controller 130 includes a first group of controls 132, which enables the user to move the first cursor 118 on the first keyboard portion 102 and to select a character 120 desired by the user. This hand-held controller 130 further includes a second group of controls 134, which enables the user to move the second cursor 119 on the second keyboard portion 104 and to select a character 120 desired by the user.

In the embodiment illustrated in FIG. 2, the first group of controls 132 is represented by a first (e.g., left) analog stick of the controller 130 (and may also include a left-hand side directional pad), and the second group of controls 134 is represented by a second (e.g., right) analog stick of the controller 130 (and may also include a right-hand side directional pad). Notably, each of the first and second group of controls 132, 134 is not limited to an analog stick, and may include only an analog stick, only a directional pad, only a combination of buttons, or a combination thereof.

In the embodiment illustrated in FIG. 2, the first keyboard portion 102 of the virtual keyboard 100 is located on the left-hand side of the screen 111 and the second keyboard portion 104 is located on the right-hand side of the screen 111. To facilitate the logic and ease of use of the virtual keyboard 100 by the user, the first group of controls 132, which enables the user to move the first cursor 118 on the left-hand side first keyboard portion 102 and to select a character 120 desired by the user, is located on a left-hand side of the hand-held controller 130. By the same token, the second group of controls 134, which enables the user to move the second cursor 119 on the right-hand side second keyboard portion 104 and to select a character 120 desired by the user, is located on a right-hand side of the hand-held controller 130.

On the exemplary virtual keyboard 100 shown in FIG. 2, letter "f" (located within the inner zone 103) is shown as being selected on the first keyboard portion 102 by the first cursor 118, and the letter "j" (located within the inner zone 107) is shown as being selected on the second keyboard portion 104 by the second cursor 119. In the example shown in FIG. 2, each of the left and right analog sticks 132, 134 of the hand-held controller 130 is shown as being in a substantially vertical position. In the illustrated embodiment, to move the first cursor 118 of the first keyboard portion 102 from the selected letter "f" to another letter of the first keyboard portion 102, the user would move the left analog stick 132 of the hand-held controller 130 in the direction of the desired letter. By the same token, to move the second cursor 119 of the second keyboard portion 104 from the selected letter "j" to another letter of the second keyboard portion 104, the user would move the right analog stick 134 of the hand-held controller 130 in the direction of the desired letter.

Figure 3:
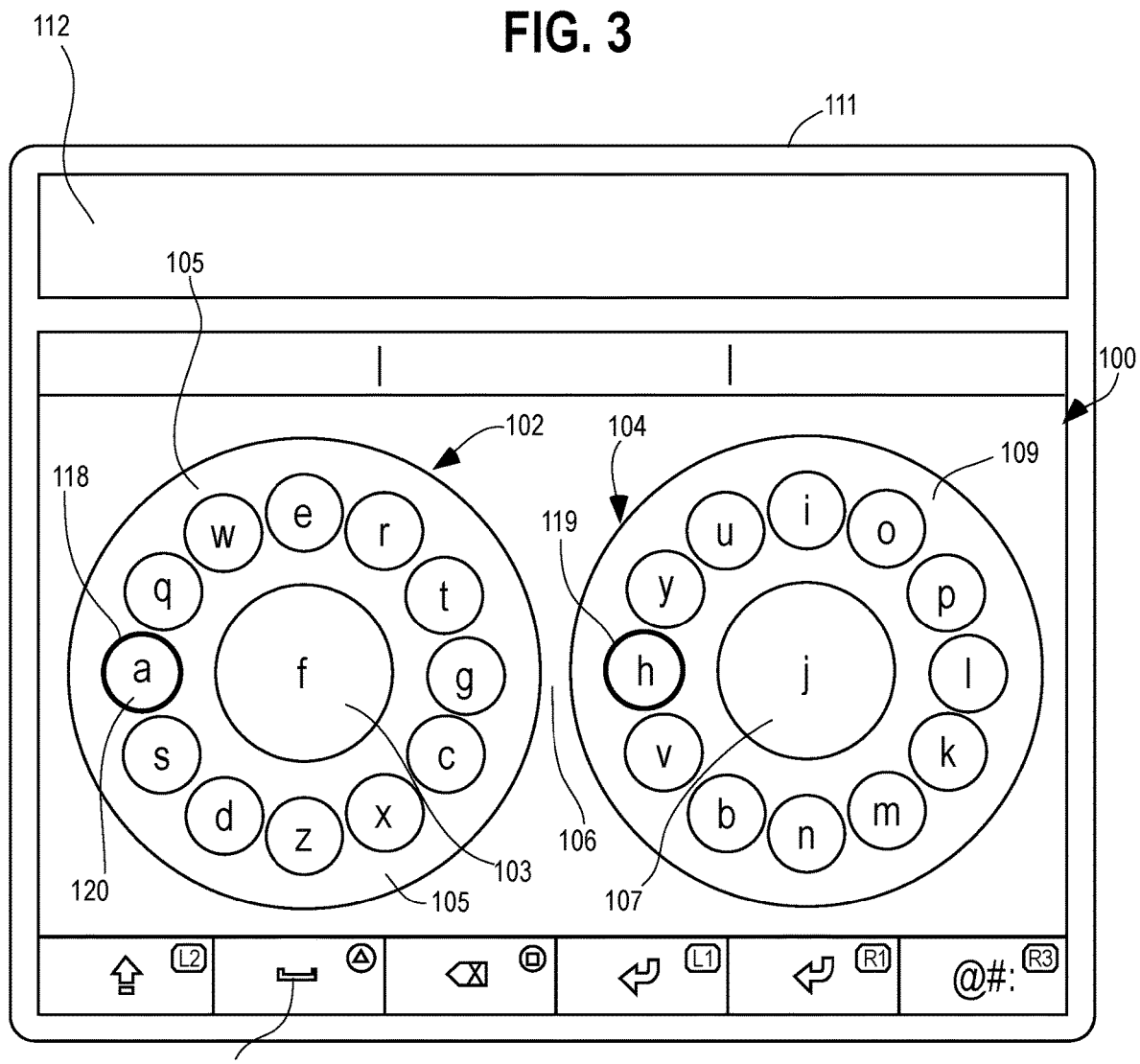
FIG. 3 depicts a screen view diagram illustrating the virtual keyboard and the hand-held controller of FIG. 2, but with the analog joysticks of the hand-held controller being moved to move the corresponding cursors on the virtual keyboard.
Figure 3:
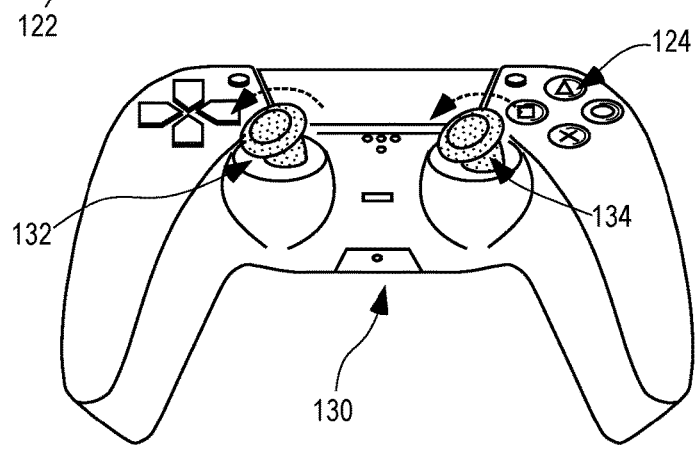

For example, FIG. 3 shows that the directional movement of the left analog stick 132 (by the user), from the substantially vertical orientation of the left analog stick 132 shown in FIG. 2, in a generally left direction (as indicated by the directional arrow in FIG. 3) and toward the letter "a," caused the first cursor 118 to move from the letter "f" to the letter "a," which is located to the left of the letter "f" on the first keyboard portion 102. Similarly, FIG. 3 shows that directional movement of the right analog stick 134 (by the user), from the substantially vertical orientation of the right analog stick 134 shown in FIG. 2, in a generally left direction (indicated by the directional arrow in FIG. 3) and toward the letter "h," caused the second cursor 119 to move from the letter "j" to the letter "h," which is located to the left of the letter "j" on the second keyboard portion 104.

If, for example, the user were to move the left analog stick 132 in a vertically upward direction from the substantially vertical orientation shown in FIG. 2, the first cursor 118 would move from the letter "f" to the letter "e," which is located directly above the letter "f" on the first keyboard portion 102. By the same token, if the user were to move the right analog stick 134 in a vertically downward direction from the substantially vertical orientation shown in FIG. 2, the second cursor 119 would move from the letter "j" to the letter "n," which is located directly below the letter "j" on the second keyboard portion 104.

In the embodiment illustrated in FIG. 2, each of the first and second cursors 118, 119 is displayed within the virtual keyboard 100 as a thicker/bold-font bounding box (as compared to the thinner bounding boxes surrounding the letters not being selected by a cursor 118, 119) that surrounds (encircles) a respective one of the characters 120 (in this case, characters "f" and "j") of the first and second keyboard portions 102, 104. While the bounding box representing each respective cursor 118, 119 is shown as being circular in FIG. 2, it will be appreciated that the bounding box may be of any other suitable shape. Further, in some aspects, instead of being represented by a bounding box that surrounds a respective one of the characters (e.g., letters) 120, the first and second cursors 118, 119 may be represented within the virtual keyboard 100 as an enlarged version of the respective character on which the respective cursor 118, 119 is located.

In other words, in some implementations, if the letter "e" were to be selected by the first cursor 118 on the first keyboard portion 102, there would be no visible circular bounding box surrounding the letter "e," but instead the letter "e" would appear in a size that is larger than its original size when not selected by the first cursor 118. In some other embodiments, instead of being represented by a bounding box that surrounds a respective one of the characters (e.g., letters) 120, the first and second cursors 118, 119 may be represented by a color (e.g., a coloring of the letter on which the respective cursor 118, 119 is located, or a coloring around the letter on which the respective cursor 118, 119 is located).

Figure 4:
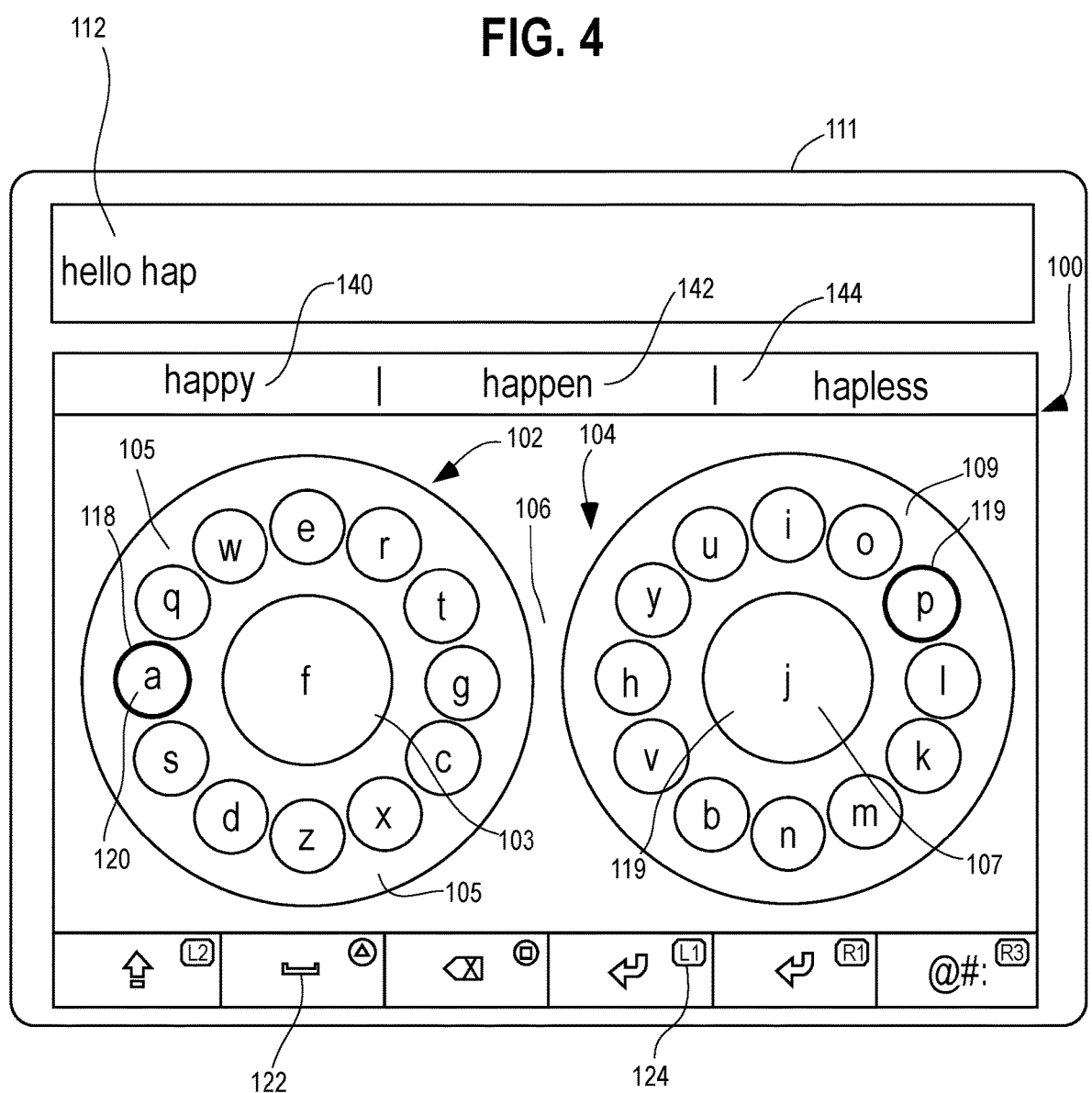
FIG. 4 depicts a display screen view diagram illustrating the virtual keyboard in accordance with some embodiments, where a predictive engine predicts and suggests a word that the user is attempting to type in based on one or more initial letters of the word.

With reference to FIG. 4, in some embodiments, the virtual keyboard 100 includes word suggestion fields 140, 142, 144 that visually indicate a suggested word to the user, which is generated by a prediction engine 180 based on an analysis of the first one or more initial letters of a word that the user starts to type into the input field 112, a represents a prediction by the prediction engine 180 of the word that the user is attempting to type into the input field 112. While three word suggestion fields 140, 142, 144 are shown in the exemplary keyboard 100 of FIG. 4, it will be appreciated that the virtual keyboard 100 may include less than three word suggestion fields or more than three word suggestion fields akin to the word suggestion fields 140, 142, 144.

In the example illustrated in FIG. 4, the prediction engine 180 has predicted, based on an analysis of the user typing in "hello hap" into the input field 112, that the user is most likely attempting to type in one of three possible words that start with "hap," namely, "happy" (shown in word suggestion field 140), "happen" (shown in word suggestion field 142), or "hapless (shown in word suggestion field 144). In some aspects, even if only the initial letter (e.g., "h") of the second word (following "happy") were to appear (instead of "hap") within the input field 112 of the keyboard 100 after being selected by the user, the predictive engine 180 could have predicted (based on historical and other data available to the predictive engine 180) that the user is attempting to type in "happy," "happen," or "hapless," thereby causing the words "happy," "happen," or "hapless" to appear in word suggestion fields 140, 142, or 144, respectfully. After that, the user would be permitted to complete the full word that the user is attempting to type within the input field 112 by selecting (e.g., via the first or second analog stick 132, 134 or via another control input (e.g., R2) of the hand-held controller 130) the full word appearing in one of the word suggestion fields 140, 142, 144 that matches the full word that the user is actually attempting to type into the input field 112.

In some embodiments, the predictive engine 180 is programmed with a trained predictive model that is trained to generate, based at least on the complete list of complete words previously typed in by the user into the input field 112, a prediction of which letter the user is most likely to select next on the virtual keyboard 100 and/or a prediction of the full word that the user is most likely attempting to enter into the input field 112. In certain aspects, the predictive model of the predictive engine 180 may be continuously updated (e.g., to expand the library of words that may be suggested) over time as the user uses the controller 130 to type in words and/or phrases into the input field 112 of the virtual keyboard 100. In the example shown in FIG. 4, the predictive engine 180 has predicted, based at least on the historical data associated with the user, that the user is attempting to enter the word "happy," "happen," or "hapless" into the input field 112.

In the embodiment illustrated in FIGS. 3-4, each of the outer zones 105, 109 includes 12 letters positioned in pattern of a complete circle (i.e., 360 degrees), such that the "hit-box" of each of the 12 letters positioned in each of the outer zones 105, 109 is set at 30 degrees. In some embodiments, the "hit-box" of each of the letters in the outer zones 105, 109 may be static regardless of the predictions by the predictive engine 180. In other words, regardless of the next letter predicted by the predictive engine 180 to be typed in by the user, the "hit-box" of each of the letters of each of the outer zones 105, 109 remains at 30 degrees. As such, it is equally easy for the user to "hit" (i.e., select) the letter that the predictive engine 180 has predicted will be the next-selected letter, or a letter to the right or left of the letter that the predictive engine 180 has predicted will be the next-selected letter.

In certain implementations, the "hit-box" of each of the letters in the outer zones 105, 109 dynamically changes based on the predictions by the predictive engine 180. In other words, in some embodiments, after the predictive engine 180 predicts the next letter that is most likely to be typed in by the user, the "hit-box" of the letter predicted to be next is increased (e.g., by 5, 10, 15, 20, etc. degrees from 30 degrees to 35, 40, 45, 50, etc. degrees) so that it is easier for the user to "hit" (i.e., select) the letter that the predictive engine 180 has predicted will be the next-selected letter than a letter to the right or left of the letter that the predictive engine 180 has predicted will be the next-selected letter. In one implementation, after the predictive engine 180 predicts the next letter that is most likely to be typed in by the user, the "hit-box" of the letter predicted to be next may be displayed in a changed (i.e., different color) so that it is easier for the user to recognize and "hit" (i.e., select) the letter that the predictive engine 180 has predicted will be the next-selected letter as opposed to a letter to the right or left (which will remain in its original color) of the letter that the predictive engine 180 has predicted will be the next-selected letter.

In some embodiments, the virtual keyboard 100 is configured such that: (1) the default position of the first cursor 118 is on the centrally-located letter "f" of the inner zone 103 of the first keyboard portion 104, and such that the first cursor 118 resets to be located on the centrally-located letter "f" after any letter of the first keyboard portion 102 is selected by the user; and (2) the default position of the second cursor 119 is on the centrally-located letter "j" of the inner zone 107 of the second keyboard portion 104, and such that the second cursor 119 resets to be located on the centrally-located letter "j" after any letter of the second keyboard portion 104 is selected by the user.

For example, in some embodiments, if the user were to use the first cursor 118 to input the letter "w" into the input field 112, the location of the first cursor 118 would reset such that the first cursor is positioned on the letter "f," and the user would have to move the first cursor 118 from its location on the letter "f" to the location of the next letter the user intends to type into . . . the text input field 112. On the other hand, in certain embodiments, the virtual keyboard 100 is configured such that each of the first and second cursors 118, 119 does not reset to the centrally-located letter of the respective first and second inner zones 103, 107, but instead remains on the letter that is last selected. For example, if the user were to use the first cursor 118 to input the letter "w" into the input field 112, the first cursor would remain on the letter "w" and the user would have to move the first cursor 118 from its location on the letter "w" to the location of the next letter the user intends to type into the text input field 112.

Without wishing to be limited to theory, the two-cursor split virtual keyboards 100 described herein enable users to type in words and phrases faster than (e.g., at least 1.5 times faster) and at least as accurately as the existing conventional virtual keyboards, thereby providing a significant time savings for the users and helping the users input their data into their on-screen virtual keyboards via an easy to use and intuitive virtual keyboard design that avoids the slow and tedious data entry offered by conventional on-screen keyboards.

Figure 5:
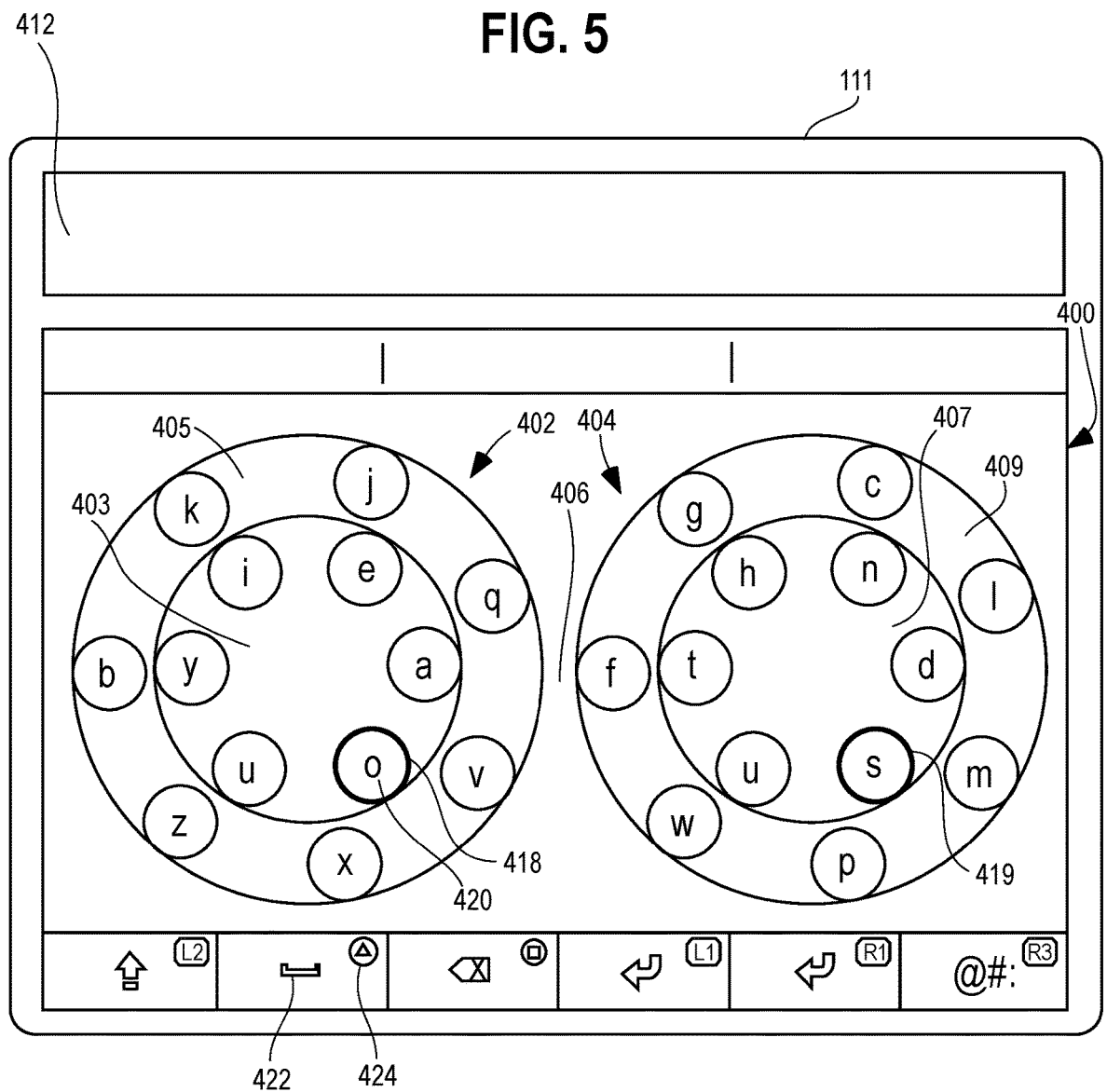
FIG. 5 depicts a display screen view diagram illustrating a hand-held controller and a virtual keyboard in accordance with some embodiments.

FIG. 5 shows a virtual keyboard 400 according to another embodiment of the invention. This exemplary virtual keyboard 400 is displayed on a screen 111 of a display (e.g., a television, monitor, handheld device, etc.), and, like the virtual keyboard 100, is designed to facilitate the ease, speed, and accuracy of typing by a user of a hand-held controller 130.

Like the virtual keyboard 100, the virtual keyboard 400 includes a first keyboard portion 402 and a second keyboard portion 404, as well as a first cursor 418 that may be used to select characters 420 on the first keyboard portion 402 and a second cursor 419 that may be used to select characters 420 on the second keyboard portion 404. Like the keyboard 100, the keyboard 400 according to the embodiment illustrated in FIG. 5 includes an input field 412, which enables the user to type in letters, numbers, and special symbols/characters by sequentially selecting the appropriate characters 420 on the virtual keyboard 400 using a hand-held controller 130. Also like the keyboard 100 shown in FIG. 2, the exemplary virtual keyboard 400 of FIG. 5 includes special characters 422 (e.g., up arrow, space bar, back space, etc.), which may be selected via a first or second cursor 418, 419 and by pressing a specific input 424 (e.g., an analog stick, a button, etc.) on a hand-held controller 130 being operated by a user, causing the specific input 424 that the user interacts with to select one of these special characters 422 to be displayed on the screen 111.

In the embodiment illustrated in FIG. 5, like the inner zones 103, 107 and outer zones 105, 109 of the keyboard 100, each of the inner zones 403, 407 and outer zones 405, 409 of the keyboard 400 has a generally circular overall shape, and each of the outer zones 405, 409 surrounds/encircles its respective inner zone 403, 407. It will be appreciated that the inner zones 403, 407 and outer zones 405, 409 do not have to be generally circular, and may be of another suitable overall shape.

Also like the virtual keyboard 100 of FIG. 2, in the exemplary keyboard 400 shown in FIG. 4, the first keyboard portion 402 and the second keyboard portion 404 of the virtual keyboard 100 are visibly separated by a space or a gap 406, making it clearly visible to a user that the first keyboard portion 402 is separate and distinct from the second keyboard portion 404. In addition, like keyboard 100 of FIG. 2, the first and second keyboard portions 402, 404 of the keyboard 400 each respectively include an inner zone 403, 407 and an outer zone 405, 409.

However, unlike the keyboard 100, the inner zones 103 and 107 of which contain one letter as discussed above, the inner zones 403, 407 of the keyboard 400 each contain six letters (i.e., "a," "e," "i," "y," "u," and "o" in inner zone 403, and letters "t," "r," "s," "d," "n," and "h" in inner zone 407). Furthermore, unlike the keyboard 100, the outer zones 105 and 109 of which contain twelve letters as discussed above, the inner zones 403, 407 of the keyboard 400 each contain seven letters (i.e., letters "b," "k," "j," "q," "v," "x," and "z" in outer zone 407, and letters "f," "g," "c," "1," "m," and "p," and "w" in outer zone 409).

It will be appreciated that the total number of letters located in each of the zones 403, 405, 407, 409 of the virtual keyboard 400, as well as the locations of each letter within its respective zone 403, 405, 407, 409 are shown by way of example only, and can be varied. In some embodiments, the letters placed into the inner zones 403, 407 of the keyboard 400 and into the outer zones 405, 409 of the keyboard 400 are chosen based on their statistical frequency of use in commonly used words. To put it another way, the letters "a," "e," "i," "y," "u," and "o" located in inner zone 403 may be placed into the inner zone 403 due to a determination that these letters are associated with a higher expected frequency of use than the letters "b," "k," "j," "q," "v," "x," and "z" located in outer zone 407. By the same token, the letters "t," "r," "s," "d," "n," and "h" letters are associated with a higher expected frequency of use than the letters "f," "g," "c," "1," "m," and "p," and "w" located in outer zone 409.

Figure 6:
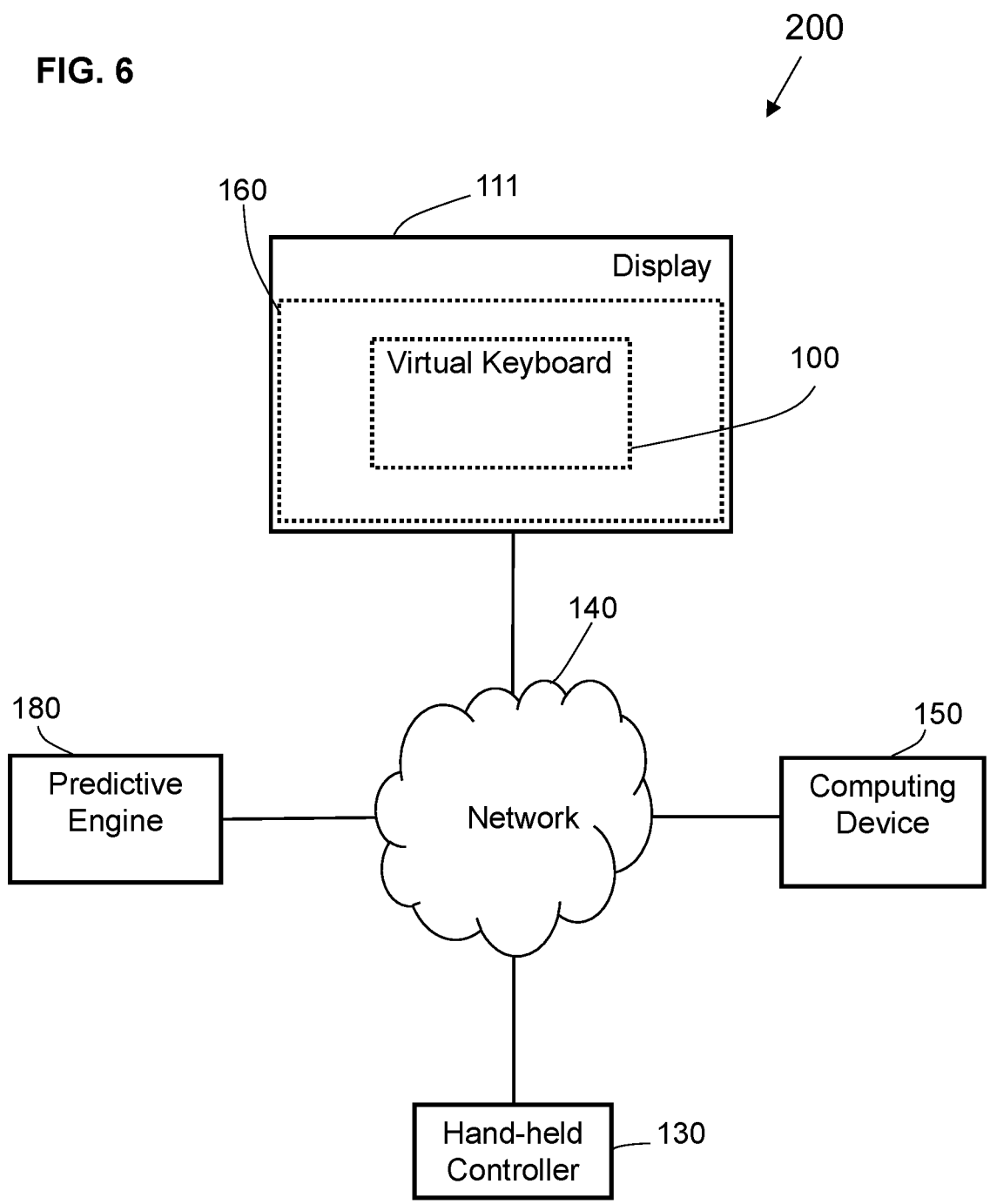
FIG. 6 is a schematic diagram of a system in accordance with some embodiments.

FIG. 6 shows an exemplary embodiment of a system 200 that enables a user to take advantage of various embodiments of the virtual keyboard 100 described above. The exemplary system 200 shown in FIG. 6 includes a screen 111

(which may be the display of stand-alone device such as a television, monitor, etc., or which may be the display of a portable hand-held device, such as a portable gaming console, smart hone, tablet, laptop, etc.). The screen 111 may display a graphical user interface 160, which may be a video stream associated with a video game, an on-screen menu, or other visual content which may utilize an on-screen virtual keyboard 100. The system 200 of FIG. 6 includes a computing device 150 (which may be one or more computing devices as pointed out below) operatively coupled/connected to a display screen 111 and configured to communicate over a network (or connection) 140 with the display screen 111, one or more hand-held controllers 130 (which may be wired or wireless), and a predictive engine 180 (which may be incorporated into the computing device 150 or stored on a computer/server remote to the computing device 150).

The exemplary network 140 depicted in FIG. 6 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 200 may take place over hard-wired, wireless, cellular, Wi-Fi or Bluetooth networked components or the like. In some embodiments, one or more electronic devices of system 200 may include cloud-based features or services, such as cloud-based memory storage, cloud-based predictive engine, etc.

The computing device 150 may be a stationary or portable electronic device, for example, a stationary gaming console, a portable gaming console, a desktop computer, a laptop computer, a tablet, a mobile phone, a single server or a series of communicatively connected servers, or any other electronic device including a control circuit that includes a programmable processor and may be coupled/connected to a display screen 111. In some embodiments, the computing device 150 is configured for running video games thereon (e.g., from a disc inserted into the computing device 150, from an onboard memory of the computing device 150, from a remote server/host, etc.) In some aspects, the computing device 150 is configured for data entry and processing and for communication with other devices of the system 200 via the network 140.

Figure 7:
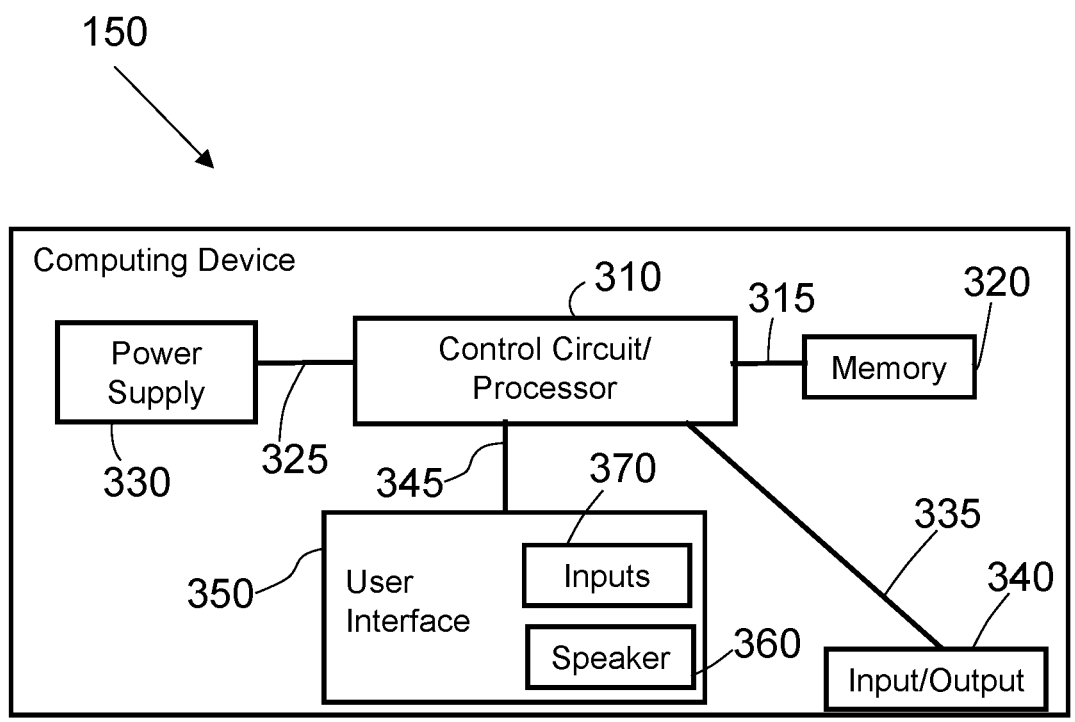
FIG. 7 is a block diagram of a computing device in accordance with some embodiments.

With reference to FIG. 7, an exemplary computing device 150 configured for use with exemplary systems and devices described herein includes a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 310 of the computing device 150 is also electrically coupled via a connection 335 to an input/output 340 that can receive signals from, for example, from one or more hand-held controllers 130, predictive engine 180, etc. The input/output 340 of the computing device 150 can also send signals to other devices, for example, a signal to the electronic display 111, predictive engine 180, etc.

The processor-based control circuit 310 of the computing device 150 shown in FIG. 7 is electrically coupled via a connection 345 to a user interface 350, which may include inputs 370 (e.g., buttons, ports, touch screens, etc.) that permit an operator of the computing device 150 to manually control the computing device 150 by inputting commands via touch button operation and/or voice commands and/or via a physically connected device (e.g., hand-held controller 130, etc.). Possible commands may, for example, cause the computing device 150 to turn on and off, reset, eject a video game disc, etc. In some embodiments, the user interface 350 of the computing device 150 may also include a speaker 360 that provides audible feedback (e.g., notifications, alerts, etc.) to the operator of the computing device 150. It will be appreciated that the performance of such functions by the processor-based control circuit 310 of the computing device 150 is not dependent on a human operator, and that the control circuit 310 of the computing device 150 may be programmed to perform such functions without a human operator.

In the embodiment illustrated in FIG. 6, the system 200 includes a predictive engine 180 that is configured to obtain (e.g., from the computing device 150 and over the network 140) and process (e.g., via an artificial intelligence/machine learning model) the data representative of the text input (e.g., words and phrases) entered by the user via the hand-held controller 130 into the input field 112 of the virtual keyboard 100. This processing of the user's input of letters or numerical characters permits the predictive engine 180 to generate one or more predictions of the words that the user is attempting to type into the virtual keyboard 100.

In the embodiment illustrated in FIG. 6, the predictive engine 180 and the computing device 150 are shown as being implemented as two separate physical devices (which may be located at the same physical location or in different physical locations). It will be appreciated, however, that the computing device 150 and the predictive engine 180 may be implemented as a single physical device. In some aspects, the predictive engine 180 may be stored, for example, on non-volatile storage media (e.g., a hard drive, flash drive, or removable optical disk) internal or external to the computing device 150, or internal or external to computing devices separate and distinct from the computing device 150. In some embodiments, the predictive engine 180 may be cloud-based.

In certain implementations, the predictive engine 180 processes the data representing the text being input by the user into the input field 112 of the virtual keyboard 100 by executing one or more trained machine learning modules and/or trained neural network modules/models. In certain aspects, the neural network executed by the predictive engine 180 (by itself or via the control circuit 310 of the computing device 150) may be a deep convolutional neural network. The neural network module/model may be trained using various data sets, including, but not limited to: letter-by-letter sequential entries made by the user when typing any word or character into the virtual keyboard 100, a library of complete words previously entered by the user into the virtual keyboard 100, a dictionary-like library of possible words that may be suggested to the user, etc.

In some embodiments, the predictive engine 180 may be trained to analyze the user's text input into the input field 112 of the virtual keyboard 100 using one or more machine learning algorithms, including but not limited to Linear Regression, Logistic Regression, Decision Tree, SVM, Naïve Bayes, kNN, K-Means, Random Forest, Dimensionality Reduction Algorithms, Large Language Model Algorithms, Transformer Algorithms, and Gradient Boosting Algorithms. In some embodiments, the trained machine learning/neural network module/model of the predictive engine 180 includes a computer program code stored in a memory and/or executed by a control circuit (e.g., the control circuit 310) to process an in-progress text input by the user to generate a list of predicted words that the user is attempting to type into the virtual keyboard.

As noted above, in some implementations, the predictive engine 180 is programmed with a trained machine learning model that is trained to generate, based on an available list of the full words previously typed in by the user into the input field 112, a prediction of which letter the user is most likely to select next on the virtual keyboard 100 and/or a prediction of the full word that the user is most likely attempting to enter into the input field 112. In certain aspects, the predictive model of the predictive engine 180 may be continuously updated in real time as a result of the user typing in new (i.e., previously unentered) words into the virtual keyboard 100.

The exemplary system 200 shown in FIG. 6 further includes a hand-held controller 130. Generally, gaming-specific computing devices/entertainment systems such as stationary or portable gaming consoles (e.g., Sony PlayStation, PlayStation Portable, Microsoft X Box, Nintendo Switch, etc.) include a hand-held game controller, which permits a user to enter in-game or menu commands or other instructions into to the computing/gaming system to control a video game, a gaming-associated stream, or a gaming-associated menu.

The exemplary hand-held controller 130 illustrated in FIGS. 2-3 includes various control inputs. For example, the hand-held controller includes a first analog joystick 132 and a second analog joystick 134, which may be referred to herein as a "first group of control inputs" and a "second group of control inputs," respectively. In some embodiments, a manipulated variable of a first or second analog stick 132, 134 (e.g., the directional movement caused by a user using the user's finger(s)) is converted from an analog value into a digital value, which is transmitted by the hand-held controller 130 to the computing device 150, in turn causing a responsive in-game action, which is visible to the user on the screen 111.

In some embodiments, the hand-held controller 130 is provided with various button inputs 124 that may be pushed by a user. In the exemplary embodiment shown in FIG. 2, the controller 130 includes a third button (e.g., L2, etc.) that permits the user to switch the letters of the first and second virtual keyboard portions between lower case letters and capital letters; a fourth button (e.g., triangle, etc.) that permits the user to create a space between the letters, a fifth button (e.g., R3, etc.) that permits the user to select a special character that is not a letter; a sixth button (e.g., square, etc.) that permits the user to undo the selectin of one or more of the letters; a seventh button (e.g., L1, etc.) that permits the user to enter a letter selected by the first cursor 118 to be entered into the text input field 112; an eighth button (e.g., R1, etc.) that permits the user to enter a letter selected by the second cursor 119 to be entered into the text input field 112; and a ninth button (e.g., touch pad, etc.) that may be touched or pressed by the user to, for example, move the first and second cursors 118, 119 or select letters via the first and second cursors 118, 119. It will be appreciated that the number of button inputs 124 of the hand-held controller 130 and the functions assigned to each of the button inputs 124 of the hand-held controller 130 are shown/described by way of example only.

In some embodiments, after a user uses the first analog stick 132 to move the first cursor 118 to the user-desired letter of the first keyboard portion 102, the user then presses one of the button inputs 124 (e.g., L1) of the hand-held controller (which may be located on a left-hand side of the hand-held controller 130 just like the first analog stick 132) to enter a selection of the user-desired letter and cause the user-selected letter to appear in the input field 112 of the virtual keyboard 100. Similarly, after a user uses the second analog stick 134 to move the second cursor 119 to the user-desired letter of the second keyboard portion 104, the user presses one of the button inputs 124 (e.g., R1) of the hand-held controller 130 (which may be located on a right-hand side of the hand-held controller 130 just like the second analog stick 134) to enter a selection of the user-desired letter and cause this letter to appear in the input field 112 of the virtual keyboard 100.

Notably, the exemplary virtual keyboard 100 illustrated in FIG. 2 includes a character field 122, which visually indicates both the function (e.g., space bar) of the character field 122 (in this case, by a bracket representing a space bar) and the button (in this case, the triangle button input 124) of the controller 130 that executes this particular function. In some embodiments, the first and second analog sticks 132, 134 may themselves be pressable, and the controller 130 may be configured such that, after the user navigates the first and second cursors 118, 119 via their respective first and second analog sticks 132, 134 to the user-desired letter, instead of pressing a separate button input 124 (e.g., L1 or R1) of the controller 130, the user may press the first analog stick 132 to select the letter underlying the first cursor 118 and the second analog stick 134 to select the letter underlying the second cursor 119.

In certain embodiments, the first and second analog sticks 132, 134 are configured to have user-adjustable dead zones, i.e., zones, where directional movement of an analog stick does not cause a responsive action on the display screen 111. In other words, the dead zone of each of the first and second analog sticks 132, 134 may be defined as an area (or an imaginary perimeter) around an analog stick 132, 134, where movement of the analog stick 132, 134 does not input a command into the controller 130 until the analog stick 132, 134 is moved by the user out of the dead zone.

The dead zone of a directional analog stick of a hand-held controller 130 may be expressed in degrees. For example, if the dead zone of the first analog stick 132 is 20 degrees, movement of the first analog stick 132 up to 20 degrees relative to the vertical would not cause the first cursor 118 to move on the first keyboard portion 102. On the other hand, the movement of the first analog stick 132 by 21 or more degrees relative to the vertical would cause the first cursor 118 to move on the first keyboard portion 102 in a direction corresponding to the movement of the direction of movement of the first analog stick 132.

In certain embodiments, the hand-held controller 130 is configured such that, when the user holds the first analog stick 132 outside of its respective dead zone, a first delay timer is triggered to delay the movement of the first cursor 118 between adjacent ones of the letters of the first keyboard portion 102 of the virtual keyboard 100 for a predetermined period of time. Similarly, in some implementations, the hand-held controller 130 is configured such that, when the user holds the second analog stick 132 outside of its respective dead zone, a second delay timer is triggered to delay the movement of the second cursor 119 between adjacent ones of the letters of the second keyboard portion 104 of the virtual keyboard 100 for a predetermined period of time.

The delay timers associated with the first and second analog sticks 132, 134 may be set independently from one another and may be identical or different from one another. In one embodiment, the hand-held controller 130 may be configured such that the length of the first and second delay timers decreases in proportion to an increasing number of adjacent letters to be moved across by the first and second cursors 118, 119 in response to a directional tilt of the first and second analog sticks 132, 134 relative to the vertical. The aim of this feature is to prevent the cursors 118, 119 from moving too fast across adjacent letters of their respective first and second keyboard portions 102, 104, thereby reducing the chances that the directional movement of the first and second analog sticks 132, 134 is too fast to permit the user to stop the first and second cursor 118, 119 on a desired letter instead of going past it. This feature is described in more detail in application Ser. No. 18/597,508, filed on the same date as the present application, entitled "ON-SCREEN, SPLIT VIRTUAL KEYBOARDS," the entire disclosure of which is hereby fully incorporated by reference herein in its entirety.

Figure 8:
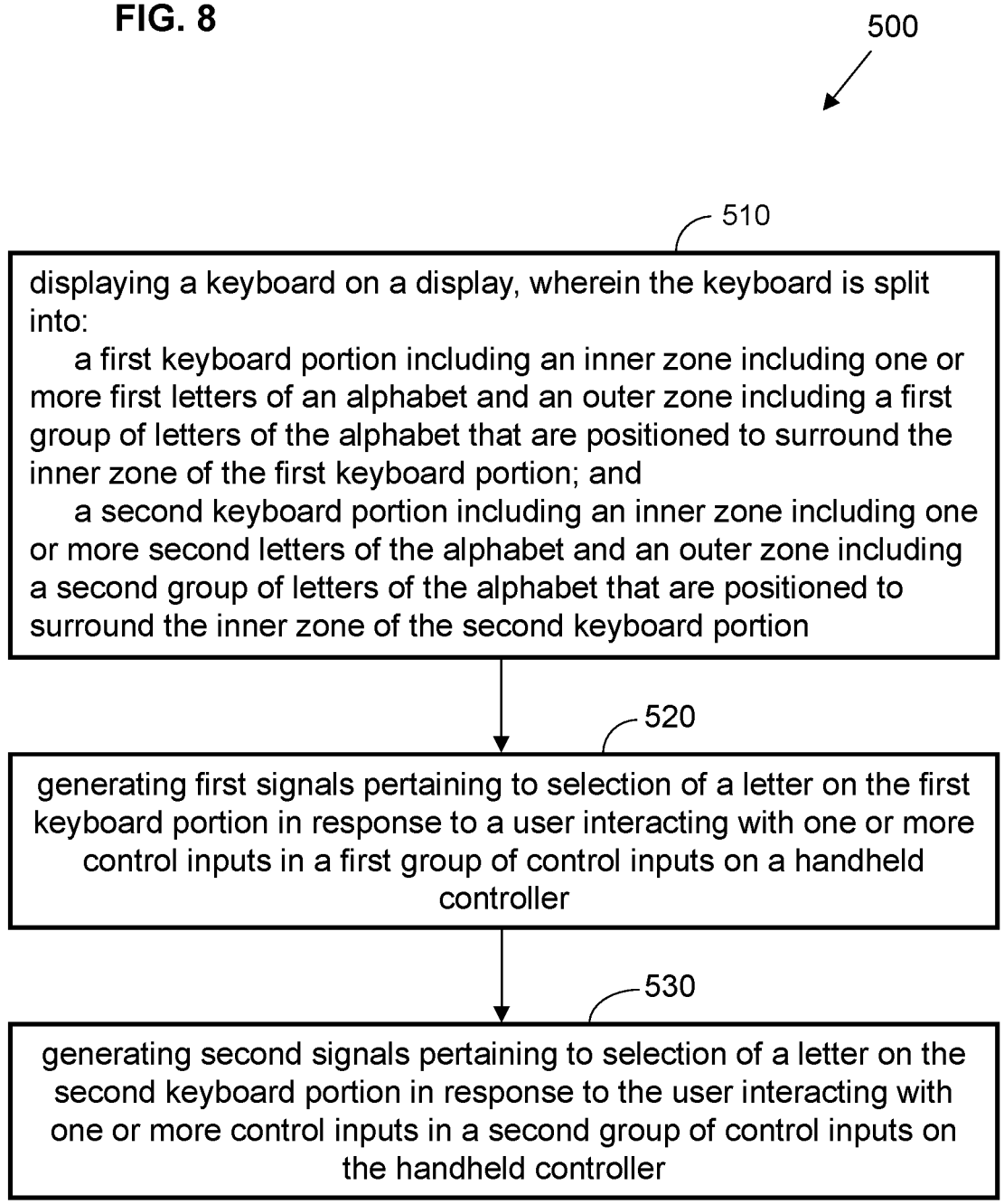
FIG. 8 is a flow diagram representative of a method in accordance with some embodiments.

FIG. 8 shows an exemplary embodiment of a method 500 of providing a virtual keyboard 100. The method 500 includes displaying a virtual keyboard 100 on a display 111 such that the virtual keyboard 100 is split into a first keyboard portion 102 and a second keyboard portion 104, with the first keyboard portion 102 including an inner zone 103 and an outer zone 105, and the second keyboard portion 104 including an inner zone 103 and an outer zone 105 (step 510). As discussed above, in some embodiments, the display 111 may be a stand-alone display such as a television, a monitor, etc. In other embodiments, the display 111 may be incorporated into a computing device 150, which may include but is not limited to a hand-held gaming console, a tablet, a laptop, a mobile phone, etc.

The exemplary illustrated method 500 further includes generating first signals pertaining to selection of a character 120 on the first keyboard portion 102 in response to a user interacting with one or more control inputs in a first group of control inputs (e.g., a first analog stick 132) on a handheld controller 130 (step 520). In addition, the method 500 includes generating second signals pertaining to selection of a character 120 on the second keyboard portion 104 in response to the user interacting with one or more control inputs in a second group of control inputs (e.g., a second analog stick 134) on the handheld controller 130. (step 530)

In some embodiments, one or more of the embodiments, methods, approaches, schemes, and/or techniques described above may be implemented in one or more computer programs or software applications executable by a processor-based apparatus or system. By way of example, such processor-based system may comprise a smartphone, tablet computer, virtual reality (VR), augmented reality (AR), or mixed reality (MR) system, entertainment system, game console, mobile device, computer, workstation, gaming computer, desktop computer, notebook computer, server, graphics workstation, client, portable device, pad-like device, communications device or equipment, etc. Such computer program(s) or software may be used for executing various steps and/or features of the above-described methods, schemes, and/or techniques. That is, the computer program(s) or software may be adapted or configured to cause or configure a processor-based apparatus or system to execute and achieve the functions described herein. For example, such computer program(s) or software may be used for implementing any embodiment of the above-described methods, steps, techniques, schemes, or features. As another example, such computer program(s) or software may be used for implementing any type of tool or similar utility that uses any one or more of the above-described embodiments, methods, approaches, schemes, and/or techniques. In some embodiments, one or more such computer programs or software may comprise a VR, AR, or MR application, communications application, object positional tracking application, a tool, utility, application, computer simulation, computer game, video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods, schemes and/or techniques. In some embodiments, such computer program (s) or software may be stored or embodied in a non-transitory computer readable storage or recording medium or media, such as a tangible computer readable storage or recording medium or media. In some embodiments, such computer program(s) or software may be stored or embodied in transitory computer readable storage or recording medium or media, such as in one or more transitory forms of signal transmission (for example, a propagating electrical or electromagnetic signal).

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, schemes, and/or techniques described herein. For example, in some embodiments the present invention provides one or more non-transitory computer readable storage mediums storing one or more computer programs adapted or configured to cause a processor-based apparatus or system to execute steps comprising any one or more of the embodiments, methods, approaches, schemes, and/or techniques described herein.

While the invention herein disclosed has been described by means of specific embodiments and applications thereof, numerous modifications and variations could be made thereto by those skilled in the art without departing from the scope of the invention set forth in the claims.

What is claimed is:

1. A method comprising:
    displaying a keyboard on a display, wherein the keyboard is split into:

a first keyboard portion including an inner zone including one or more first letters of an alphabet and an outer zone including a first group of letters of the alphabet that are positioned to surround the one or more first letters included in the inner zone of the first keyboard portion with even spacing, the first group of letters being different than the one or more first letters; and a second keyboard portion including an inner zone including one or more second letters of the alphabet and an outer zone including a second group of letters of the alphabet that are positioned to surround the one or more second letters included in inner zone of the second keyboard portion with even spacing, the second group of letters being different than the one or more second letters;

generating first signals pertaining to selection of a letter on the first keyboard portion in response to a user interacting with one or more control inputs in a first group of control inputs on a handheld controller; and generating second signals pertaining to selection of a letter on the second keyboard portion in response to the user interacting with one or more control inputs in a second group of control inputs on the handheld controller.

2. The method of claim 1, wherein:
the first signals cause a first cursor to move within the first keyboard portion and cause the letter in the first keyboard portion to be selected; and
the second signals cause a second cursor to move within the second keyboard portion and cause the letter in the second keyboard portion to be selected.

3. The method of claim 1,
wherein the first group of letters of the alphabet of the outer zone of the first keyboard portion is positioned to encircle the one or more first letters of the alphabet of the inner zone of the first keyboard portion, and
wherein the second group of letters of the alphabet of the outer zone of the second keyboard portion is positioned to encircle the one or more first letters of the alphabet of the inner zone of the second keyboard portion.

4. The method of claim 1, wherein:
the first group of control inputs is located on a left side of the handheld controller; and
the second group of control inputs is located on a right side of the handheld controller.

5. The method of claim 1, wherein:
the user interacting with one or more control inputs in the first group of control inputs on the handheld controller comprises the user interacting with a first analog control input; and
the user interacting with one or more control inputs in the second group of control inputs on the handheld controller comprises the user interacting with a second analog control input.

6. The method of claim 1, wherein the one or more control inputs in the first group of control inputs and the one or more control inputs in the second group of control inputs are respectively configured to allow a first cursor on the first keyboard portion and a second cursor on the second keyboard portion to be moved substantially simultaneously.

7. The method of claim 1, wherein:
the inner zone of each of the first and second keyboards includes one letter and the outer zone of each of the first and second keyboards includes twelve letters; or the inner zone of each of the first and second keyboards includes at least two letters and the outer zone of each of the first and second keyboards includes at most eleven letters.

8. The method of claim 1, wherein the user interacting with the one or more control inputs in the first group of control inputs on the handheld controller comprises the user selecting one or more of the first letters of the alphabet in the inner zone of the first keyboard portion using a particular control input that is different than a directional input of an analog joystick.

9. A non-transitory computer readable storage medium storing one or more computer programs configured to cause a processor-based system to execute steps comprising:
displaying a keyboard on a display, wherein the keyboard is split into:
a first keyboard portion including an inner zone including one or more first letters of an alphabet and an outer zone including a first group of letters of the alphabet that are positioned to surround the one or more first letters included in inner zone of the first keyboard portion with even spacing, the first group of letters being different than the one or more first letters; and a second keyboard portion including an inner zone including one or more second letters of the alphabet and an outer zone including a second group of letters of the alphabet that are positioned to surround the one or more second letters included in the inner zone of the second keyboard portion with even spacing, the second group of letters being different than the one or more second letters;

generating first signals pertaining to selection of a letter on the first keyboard portion in response to a user interacting with one or more control inputs in a first group of control inputs on a handheld controller; and generating second signals pertaining to selection of a letter on the second keyboard portion in response to the user interacting with one or more control inputs in a second group of control inputs on the handheld controller.

10. The non-transitory computer readable storage medium of claim 9, wherein:
the first signals cause a first cursor to move within the first keyboard portion and cause the letter in the first keyboard portion to be selected; and
the second signals cause a second cursor to move within the second keyboard portion and cause the letter in the second keyboard portion to be selected.

11. The non-transitory computer readable storage medium of claim 9,
wherein the first group of letters of the alphabet of the outer zone of the first keyboard portion is positioned to encircle the one or more first letters of the alphabet of the inner zone of the first keyboard portion, and
wherein the second group of letters of the alphabet of the outer zone of the second keyboard portion is positioned to encircle the one or more first letters of the alphabet of the inner zone of the second keyboard portion.

12. The non-transitory computer readable storage medium of claim 9, wherein:
the first group of control inputs is located on a left side of the handheld controller; and
the second group of control inputs is located on a right side of the handheld controller.

13. The non-transitory computer readable storage medium of claim 9, wherein:

the user interacting with one or more control inputs in the first group of control inputs on the handheld controller comprises the user interacting with a first analog control input; and the user interacting with one or more control inputs in the second group of control inputs on the handheld controller comprises the user interacting with a second analog control input.

14. The non-transitory computer readable storage medium of claim 13, wherein the one or more control inputs in the first group of control inputs and the one or more control inputs in the second group of control inputs are respectively configured to allow a first cursor on the first keyboard portion and a second cursor on the second keyboard portion to be moved substantially simultaneously.

15. The non-transitory computer readable storage medium of claim 13, wherein:

the inner zone of each of the first and second keyboards includes one letter and the outer zone of each of the first and second keyboards includes twelve letters; or the inner zone of each of the first and second keyboards includes at least two letters and the outer zone of each of the first and second keyboards includes at most eleven letters.

16. A system, comprising:

a display;

a handheld controller; and a processor-based system in communication with the display and the handheld controller and configured to execute steps comprising:

displaying a keyboard on a display, wherein the keyboard is split into:

a first keyboard portion including an inner zone including one or more first letters of an alphabet and an outer zone including a first group of letters of the alphabet that are positioned to surround the one or more first letters included in the inner zone of the first keyboard portion with even spacing, the first group of letters being different than the one or more first letters; and a second keyboard portion including an inner zone including one or more second letters of the alphabet and an outer zone including a second group of letters of the alphabet that are positioned to surround the one or more second letters included in the inner zone of the second keyboard portion with even spacing, the first group of letters being different than the one or more first letters;

generating first signals pertaining to selection of a letter on the first keyboard portion in response to a user interacting with one or more control inputs in a first group of control inputs on a handheld controller; and generating second signals pertaining to selection of a letter on the second keyboard portion in response to the user interacting with one or more control inputs in a second group of control inputs on the handheld controller.

17. The system of claim 16, wherein:

the first signals cause a first cursor to move within the first keyboard portion and cause the letter in the first keyboard portion to be selected; and the second signals cause a second cursor to move within the second keyboard portion and cause the letter in the second keyboard portion to be selected.

18. The system of claim 16, wherein the first group of letters of the alphabet of the outer zone of the first keyboard portion is positioned to encircle the one or more first letters of the alphabet of the inner zone of the first keyboard portion, and wherein the second group of letters of the alphabet of the outer zone of the second keyboard portion is positioned to encircle the one or more first letters of the alphabet of the inner zone of the second keyboard portion.

19. The system of claim 16, wherein:

the first group of control inputs is located on a left side of the handheld controller; and the second group of control inputs is located on a right side of the handheld controller.

20. The system of claim 16, wherein:

the user interacting with one or more control inputs in the first group of control inputs on the handheld controller comprises the user interacting with a first analog control input; and the user interacting with one or more control inputs in the second group of control inputs on the handheld controller comprises the user interacting with a second analog control input.

21. The system of claim 16, wherein the one or more control inputs in the first group of control inputs and the one or more control inputs in the second group of control inputs are respectively configured to allow a first cursor on the first keyboard portion and a second cursor on the second keyboard portion to be moved substantially simultaneously.

22. The system of claim 16, wherein:

the inner zone of each of the first and second keyboards includes one letter and the outer zone of each of the first and second keyboards includes twelve letters; or the inner zone of each of the first and second keyboards includes at least two letters and the outer zone of each of the first and second keyboards includes at most eleven letters.

* * * * *

UNITED STATES PATENT AND TRADEMARK OFFICE
CERTIFICATE OF CORRECTION

| | | |
|---|---|---|
| PATENT NO. | : 12,416,977 B1 | Page 1 of 1 |
| APPLICATION NO. | : 18/597555 | |
| DATED | : September 16, 2025 | |
| INVENTOR(S) | : Francis Wu et al. | |

It is certified that error appears in the above-identified patent and that said Letters Patent is hereby corrected as shown below:

In the Claims

Column 19, Line 10, Claim 14, please replace "claim 13," with -- claim 9, --.

Column 19, Line 17, Claim 15, please replace "claim 13," with -- claim 9, --.

Signed and Sealed this
Eighteenth Day of November, 2025

John A. Squires
*Director of the United States Patent and Trademark Office*